(12) United States Patent
Hsieh et al.

(10) Patent No.: US 9,953,558 B1
(45) Date of Patent: Apr. 24, 2018

(54) TRANSPARENT DISPLAY APPARATUS AND METHOD FOR DRIVING TRANSPARENT DISPLAY PANEL THEREOF

(71) Applicant: Chunghwa Picture Tubes, LTD., Taoyuan (TW)

(72) Inventors: Pei-Lin Hsieh, Taoyuan (TW); Hsiang-Tan Lin, Keelung (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 0 days.

(21) Appl. No.: 15/351,446

(22) Filed: Nov. 15, 2016

(30) Foreign Application Priority Data

Sep. 30, 2016 (CN) .......................... 2016 1 0867416

(51) Int. Cl.
*G09G 3/20* (2006.01)
*G09G 3/36* (2006.01)
*G06F 3/147* (2006.01)
*G06F 3/14* (2006.01)

(52) U.S. Cl.
CPC ........... *G09G 3/2011* (2013.01); *G06F 3/147* (2013.01); *G06F 3/1423* (2013.01); *G09G 3/36* (2013.01); *G09G 2320/0276* (2013.01); *G09G 2320/08* (2013.01)

(58) Field of Classification Search
CPC .... G09G 3/2011; G09G 3/36; G09G 2320/08; G09G 2320/0276; G06F 3/147; G06F 3/1423
See application file for complete search history.

(56) References Cited

U.S. PATENT DOCUMENTS

| | | | |
|---|---|---|---|
| 2011/0164047 A1* | 7/2011 | Pance | G06F 1/1647 345/581 |
| 2017/0060512 A1* | 3/2017 | Rakshit | G06F 3/1423 |
| 2017/0098408 A1* | 4/2017 | Hsieh | G09G 3/2074 |

FOREIGN PATENT DOCUMENTS

TW       I466094       12/2014

* cited by examiner

*Primary Examiner* — Abhishek Sarma
(74) *Attorney, Agent, or Firm* — JCIPRNET

(57) ABSTRACT

A transparent display apparatus and a method for driving a transparent display panel thereof are provided. The transparent display apparatus includes a first and second transparent display panels, an image processor and a display driver. The image processor receives an image signal having display data, a transparency control signal having transparent values, a first and second transparent parameters. The image processor calculates according to the image signal, the transparency control signal, the first and second transparent parameters to provide a first display signal having first gray data and a second display signal respectively having second gray data. The display driver drives the first and second transparent display panels according to the first and second gray data, so as to display a display image having all gradations between a black state, a white state and a transparent state through the coincided first and second transparent display panels.

11 Claims, 3 Drawing Sheets

TRANSPARENT DISPLAY APPARATUS AND METHOD FOR DRIVING TRANSPARENT DISPLAY PANEL THEREOF

CROSS-REFERENCE TO RELATED APPLICATION

This application claims the priority benefit of China application serial no. 201610867416.2, filed on Sep. 30, 2016. The entirety of the above-mentioned patent application is hereby incorporated by reference herein and made a part of this specification.

BACKGROUND OF THE INVENTION

Field of the Invention

The invention relates to a display technique, and particularly relates to a transparent display apparatus and a method for driving a transparent display panel thereof.

Description of Related Art

Generally, liquid crystal displays (LCDs) are roughly divided into three types, i.e. transmissive LCDs, reflective LCDs and transflective LCDs. Along with increase of display applications, transparent display panel is developed in recent years. Since the transparent display panel has enough light transmittance, a user may view a display content through the transparent display panel, and may observe a background layout behind the transparent display panel. Besides an original transparent display function, the transparent display panel can also be used for information display, which gradually draws attention of the market.

The present transparent display technique may change gray values of an image into transparency, and display the image through the transparency of the transparent display panel. Taking a transparent display panel adapted to a light box as an example, a maximum value of gray value (i.e. a white state, which may represent a white color) can be applied to present a maximum transparency (i.e. a transparent state), though it may result in a fact that the white state cannot be veritably presented. In another transparent display panel, a minimum value of gray value (i.e. a black state) can be applied to present the transparent state, through it may result in a fact that the black state cannot be veritably presented.

According to the above description, in the present display technique, once the type of the transparent display panel is determined, one of the black state and the white state cannot be presented. Moreover, since the transparency of the transparent display panel is determined by the gray values, adjustment of the transparency of the transparent display panel is limited. Therefore, a display effect and a user experience of the transparent display panel are greatly influenced.

SUMMARY OF THE INVENTION

The invention is directed to a transparent display apparatus and a method for driving a transparent display panel thereof, by which the transparent display panel is adapted to display an image of a black state, a white state and a transparent state, so as to improve a display effect and a user experience of the transparent display apparatus.

The invention provides a transparent display apparatus including a first transparent display panel, a second transparent display panel, an image processor and a display driver. The first transparent display panel has a first gradation within a section from a transparent state to a white state. The second transparent display panel has a second gradation within a section from a black state to the transparent state, and is coincided with the first transparent display panel. The image processor receives an image signal having a plurality of display data, a transparency control signal having a plurality of transparent values, a first transparent parameter and a second transparent parameter. The image processor performs calculation according to the image signal, the transparency control signal and the first transparent parameter to provide a first display signal having a plurality of first gray data, and performs calculation according to the image signal, the transparency control signal and the second transparent parameter to provide a second display signal having a plurality of second gray data, wherein the first transparent parameter is used for representing a first gray value corresponding to the transparent state of the first transparent display panel, and the second transparent parameter is used for representing a second gray value corresponding to the transparent state of the second transparent display panel. The display driver is coupled to the first transparent display panel, the second transparent display panel and the image processor. The display driver drives the first transparent display panel according to the first gray data, and drives the second transparent display panel according to the second gray data, so as to display a display image having all gradations between the black state, the white state and the transparent state through the coincided first transparent display panel and the second transparent display panel.

The invention provides a method for driving a transparent display panel, which is adapted to a transparent display apparatus having a first transparent display panel and a second transparent display panel coincided with each other, and the method includes following steps. An image signal having a plurality of display data, a transparency control signal having a plurality of transparent values, a first transparent parameter and a second transparent parameter are received by an image processor, wherein the first transparent parameter is used for representing a first gray value corresponding to the transparent state of the first transparent display panel, and the second transparent parameter is used for representing a second gray value corresponding to the transparent state of the second transparent display panel. The image processor performs calculation according to the image signal, the transparency control signal and the first transparent parameter to provide a first display signal having a plurality of first gray data, so as to drive the first transparent display panel, wherein the first transparent display panel has a first gradation within a section from a transparent state to a white state. The image processor performs calculation according to the image signal, the transparency control signal and the second transparent parameter to provide a second display signal having a plurality of second gray data, so as to drive the second transparent display panel, wherein the second transparent display panel has a second gradation within a section from a black state to the transparent state. A display image having all gradations between the black state, the white state and the transparent state is displayed through the coincided first transparent display panel and the second transparent display panel.

According to the above description, in the transparent display apparatus and the method for driving the transparent display panel of the invention, the first display signal and the second display signal are correspondingly provided according to transmittance characteristics of the first transparent display panel and the second transparent display panel having different gradations, so as to correspondingly drive the first transparent display panel and the second transparent display panel. In this way, the image of the black state, the white state and the transparent state is displayed through the coincided first transparent display panel and the second transparent display panel, so as to improve the display effect and user experience of the transparent display apparatus.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present preferred embodiments of the invention, examples of which are illustrated in the accompanying drawings. The provided embodiments are only used for explaining the invention, and are not used for limiting the scope of the invention.

Figure 1:
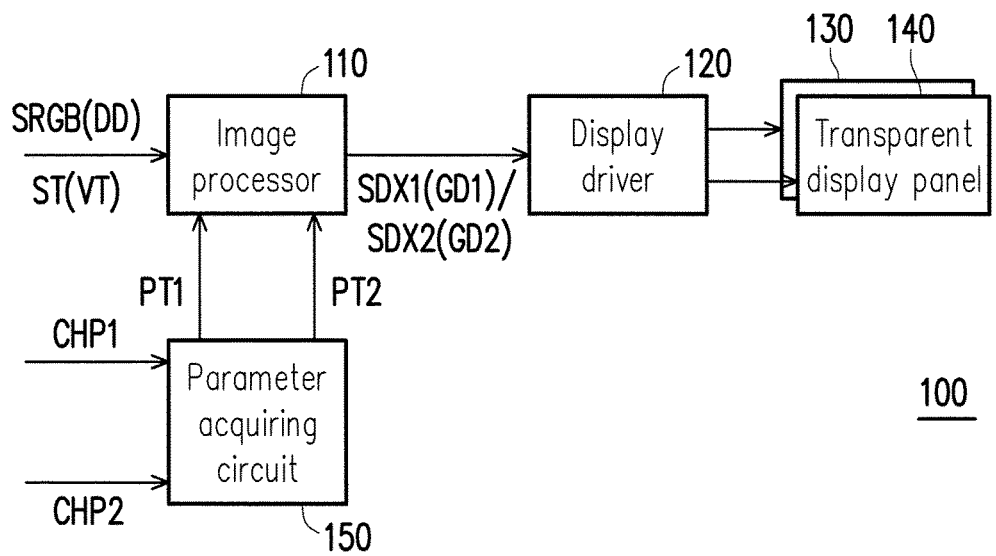
FIG. 1 is a system schematic diagram of a transparent display apparatus according to an embodiment of the invention.

FIG. 1 is a system schematic diagram of a transparent display apparatus according to an embodiment of the invention. Referring to FIG. 1, in the present embodiment, the transparent display apparatus 100 includes an image processor 110, a display driver 120, a first transparent display panel 130, a second transparent display panel 140 and a parameter acquiring circuit 150. The first transparent display panel 130, for example, has a first gradation within a section from a transparent state to a white state, i.e. a transparent display panel with a gray value "0" (i.e. the minimum gray value) corresponding to the transparent state. The second transparent display panel 140, for example, has a second gradation within a section from a black state to the transparent state, i.e. a transparent display panel with a gray value "255" (i.e. the minimum gray value) corresponding to the transparent state. Moreover, the second transparent display panel 140 is coincided with the first transparent display panel 130.

The parameter acquiring circuit 150 is coupled to the image processor 110, and receives a first transmittance characteristic CHP1 of the first transparent display panel 130, and a second transmittance characteristic CHP2 of the second transparent display panel 140, so as to provide a first transparent parameter PT1 and a second transparent parameter PT2 to the image processor 110, wherein the first transmittance characteristic CHP1 and the second transmittance characteristic CHP2 can be presented through a look-up table, or represented in form of operators.

Moreover, the first transparent parameter PT1 is used for representing a first gray value corresponding to the transparent state of the first transparent display panel 130 (the first gray value herein is the gray value "0", i.e. the minimum gray value in a gray level range 0-255 of an image signal SRGB), and the second transparent parameter PT2 is used for representing a second gray value corresponding to the transparent state of the second transparent display panel 140 (the second gray value herein is the gray value "255", i.e. the maximum gray value in the gray level range 0-255 of the image signal SRGB).

The image processor 110 receives the image signal SRGB having a plurality of display data DD and a transparency control signal ST having a plurality of transparent values VT, and the image processor 110 is coupled to the parameter acquiring circuit 150 to receive the first transparent parameter PT1 and the second transparent parameter PT2.

Then, the image processor 110 performs calculation according to the image signal SRGB, the transparency control signal ST and the first transparent parameter PT1 to provide a first display signal SDX1 having a plurality of first gray data GD1, and the image processor 110 performs calculation according to the image signal SRGB, the transparency control signal ST and the second transparent parameter PT2 to provide a second display signal SDX2 having a plurality of second gray data GD2.

Each of the transparent values VT is, for example, a numeric value of one byte (i.e. a decimal value of 0-255). Each of the transparent values VT is used for representing whether a corresponding pixel on the first transparent display panel 130 and the second transparent display panel 140 presents the transparent state, i.e. the transparency control signal ST is used for deciding transparent areas (i.e. to display the transparent state) and non-transparent areas (i.e. to display a brightness other than the transparent state) on the first transparent display panel 130 and the second transparent display panel 140, and the transparency control signal ST can be determined by the user or determined through calculation based on the image signal SRGB and an algorithm.

The display driver 120 is coupled to the image processor 110, the first transparent display panel 130 and the second transparent display panel 140 to receive the first display signal SDX1 and the second display signal SDX2. The display driver 120 drives the first transparent display panel 130 according to the first gray data GD1 of the first display signal SDX1 to display a display image having the transparent state and the white state. The display driver 120 drives the second transparent display panel 140 according to the second gray data GD2 of the second display signal SDX2 to display a display image having the black state and the transparent state. Due to the complementary characteristic of the first transparent display panel 130 and the second transparent display panel 140, the coincided first transparent display panel 130 and the second transparent display panel 140 may display a display image having all gradations between the black state, the white state and the transparent state.

Figure 2:
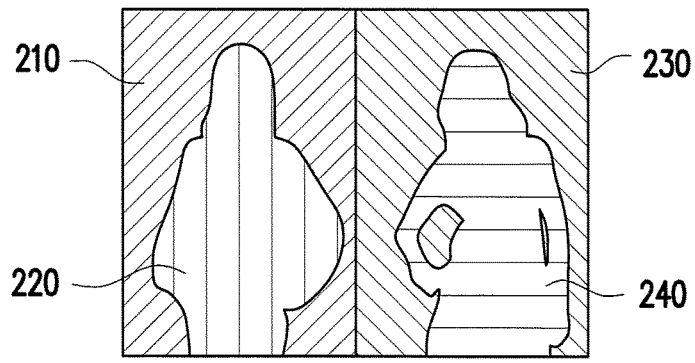
FIG. 2 is an image schematic diagram of an image signal according to an embodiment of the invention.
Figure 3:
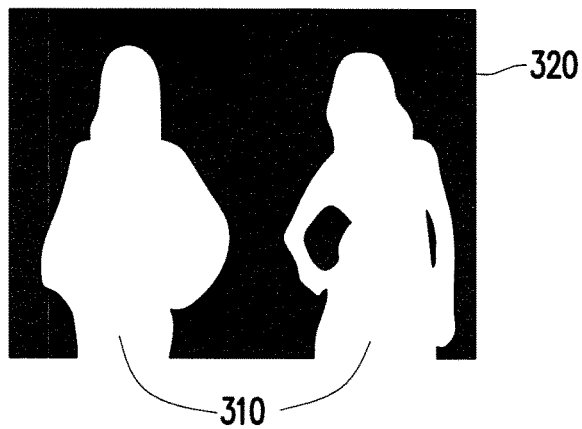
FIG. 3 is an image schematic diagram of a transparency control signal according to an embodiment of the invention.
Figure 4:
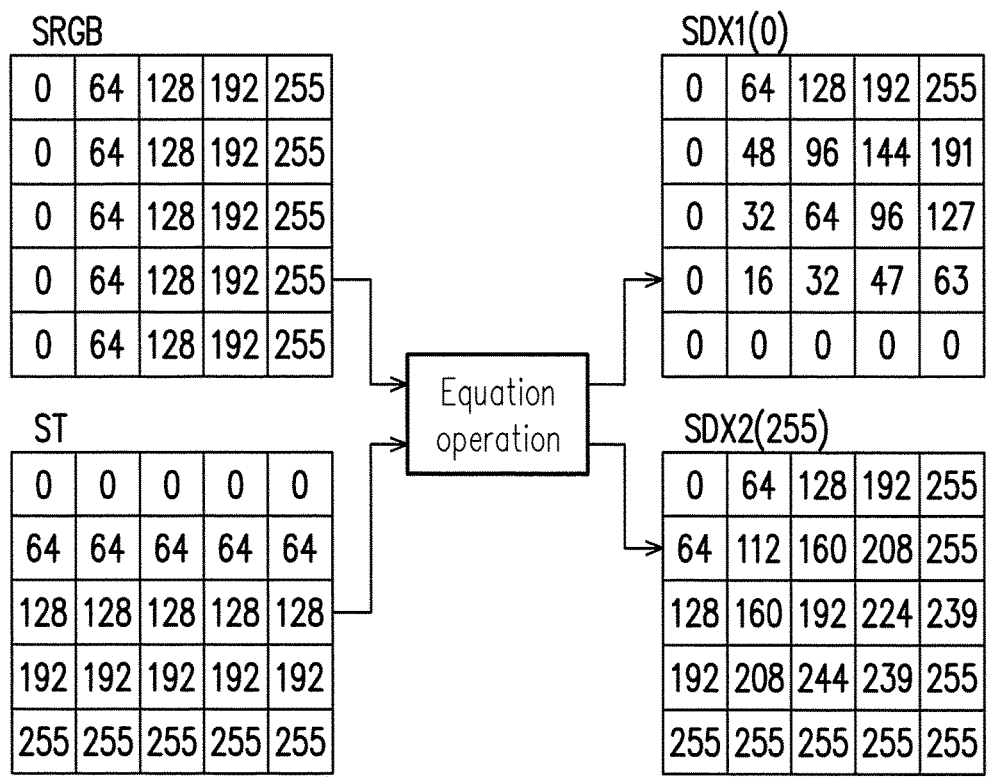
FIG. 4 is a schematic diagram of calculation of a first display signal and a second display signal according to an embodiment of the invention.

FIG. 2 is an image schematic diagram of an image signal according to an embodiment of the invention. FIG. 3 is an image schematic diagram of a transparency control signal according to an embodiment of the invention. FIG. 4 is a schematic diagram of calculation of a first display signal and a second display signal according to an embodiment of the invention. Referring to FIG. 1 to FIG. 4, in the present embodiment, a foreground (for example, a black figure 220, a white figure 240) is set to a non-transparent state, as shown by a region 310, and the transparent value VT corresponding to each of the pixels in the region 310 is, for example, "0". Moreover, a background (i.e. a black background 210, a white background 230) is set to the transparent state, as shown by a region 320, and the transparent value VT corresponding to each of the pixels in the region 320 is, for example, "255".

According to the above description, the black figure 220 and the white figure 240 have the non-transparent state, so that the gray values of the corresponding first gray data GD1 and the second gray data GD2 can be set to the gray value of the corresponding display data DD; the black background 210 and the white background 230 have the transparent state, the corresponding first gray data GD1 is set to the gray value "0", and the corresponding second gray data GD2 is set to the gray value "255". In other words, the lower the transparency of the pixel is, the more the gray values of the corresponding first gray data GD1 and the second gray data GD2 are close to the gray value of the corresponding display data DD; and the higher the transparency of the pixel is, the more the corresponding first gray data GD1 is close to the gray value "0", and the more the corresponding second gray data GD2 is close to the gray value "255".

Deduced according to the above conclusion, the gray value of each of the first gray data GD1 can be determined according to an equation $GL1=\alpha_1(VT) \times g1 + \beta_1(VT) \times RGB$, where GL1 is the gray value of each of the first gray data GD1, VT is the corresponding transparent value, g1 is the first transparent parameter PT1, RGB is the gray value of the corresponding display data DD, $\alpha_1(VT)$ is a function for calculating transparency and is proportional to the corresponding transparent value VT, and $\beta_1(VT)$ is a function for calculating a degree of opacity and is inversely proportional to the corresponding transparent value VT. Moreover, the gray value of each of the second gray data GD2 can be determined according to an equation $GL2=\alpha_2(VT) \times g2 + \beta_2(VT) \times RGB$, where GL2 is the gray value of each of the second gray data GD2, VT is the corresponding transparent value, g2 is the second transparent parameter PT2, RGB is the gray value of the corresponding display data DD, $\alpha_2(VT)$ is a function for calculating transparency and is proportional to the corresponding transparent value VT, and $\beta_2(VT)$ is a function for calculating a degree of opacity and is inversely proportional to the corresponding transparent value VT.

For example, $\alpha_1(VT)=VT/G_{MAX}$, $\beta_1(VT)=(1-VT/G_{MAX})$, $\alpha_2(VT)=VT/G_{MAX}$, $\beta_2(VT)=(1-VT/G_{MAX})$, $G_{MAX}$ is the maximum gray value in the gray level range 0-255 of the image signal SRGB (i.e. the gray value "255").

Referring to FIG. 4, in the present embodiment, the image signal SRGB, the transparency control signal ST, the first display signal SDX1 and the second display signal SDX2 are, for example, respectively implemented by a 5×5 array, wherein the values in the grids of the image signal SRGB represent gray values of each of the pixels, the values in the grids of the transparency control signal ST represent transparent values corresponding to each of the pixels, the values in the grids of the first display signal SDX1 represent gray values of each of the first gray data GD1, and the values in the grids of the second display signal SDX2 represent gray values of each of the second gray data GD2.

The values on an upper left-lower right diagonal of each array are taken as an example to describe operations of the equations of the present embodiment. When the gray value of the display data DD is "0" and the corresponding transparent value VT is "0", GL1=(0/255)×0+(1−0/255)×0=0, and GL2=(0/255)×255+(1−0/255)×0=0; and when the gray value of the display data DD is "64" and the corresponding transparent value VT is "64", GL1=(64/255)×0+(1−64/255)×64=47.94 (rounded to an integer of 48), and GL2= (64/255)×255+(1−64/255)×64=111.93 (rounded to an integer of 112). Due to increase of the transparent value VT, the gray value GL1 approaches to the gray value "0" to improve the transparency of the pixel in the first transparent display panel 130, and the gray value GL2 approaches to the gray value "255" to improve the transparency of the pixel in the second transparent display panel 140.

Similarly, when the gray value of the display data DD is "128" and the corresponding transparent value VT is "128", GL1=(128/255)×0+(1−128/255)×128=63.75 (rounded to an integer of 64), and GL2=(128/255)×255+(1−128/255)× 128=191.75 (rounded to an integer of 192). When the gray value of the display data DD is "192" and the corresponding transparent value VT is "192", GL1=(192/255)×0+(1−192/ 255)×192=47.44 (rounded to an integer of 47), and GL2= (192/255)×255+(1−192/255)×192=239.44 (rounded to an integer of 239). When the gray value of the display data DD is "255" and the corresponding transparent value VT is "255", GL1=(255/255)×0+(1−255/255)×255=0, and GL2= (255/255)×255+(1−255/255)×255=255.

Figure 5:
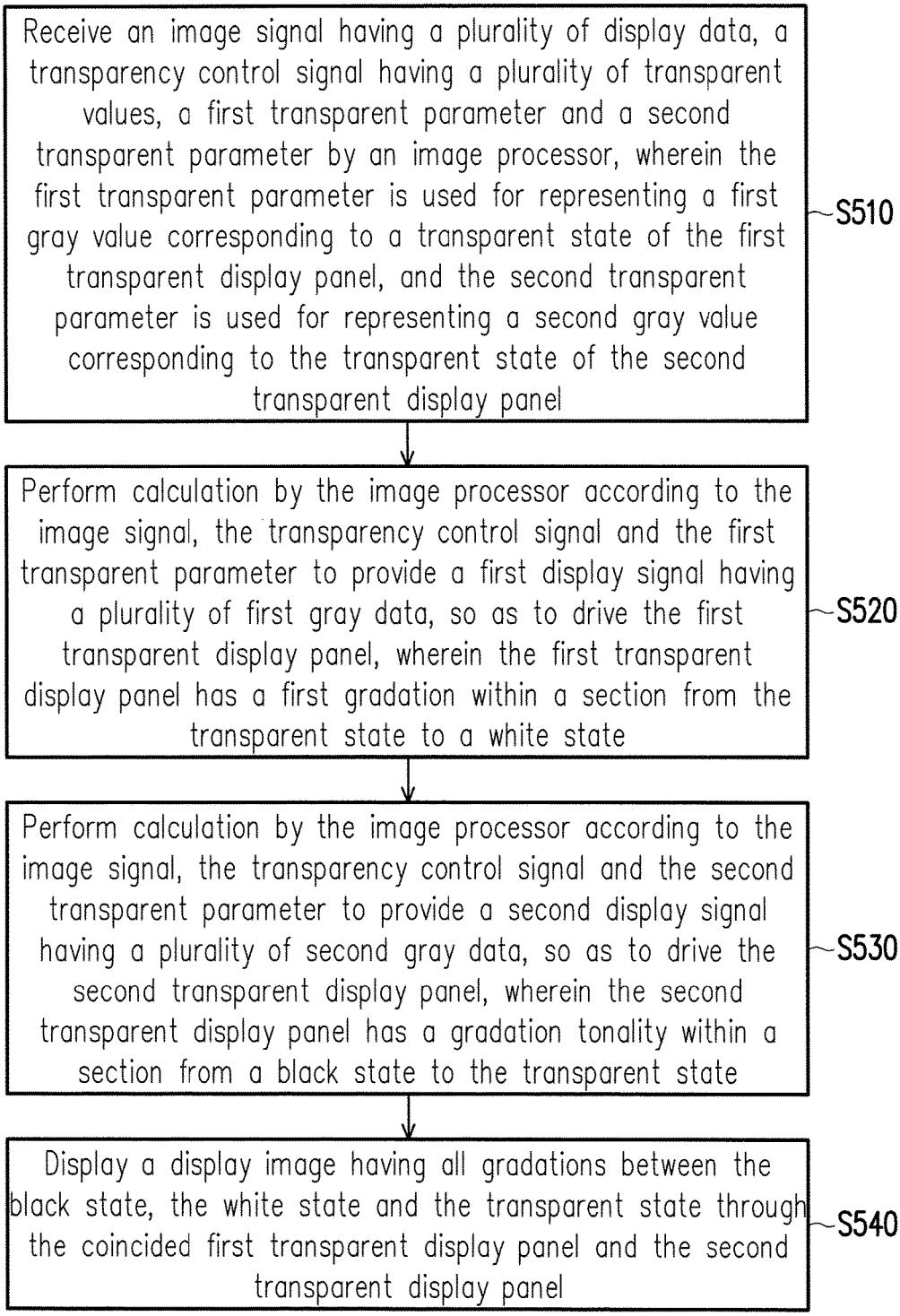
FIG. 5 is a flowchart illustrating a method for driving a transparent display panel according to an embodiment of the invention.

FIG. 5 is a flowchart illustrating a method for driving a transparent display panel according to an embodiment of the invention. Referring to FIG. 5, in the present embodiment, the method for driving the transparent display panel is adapted to a transparent display apparatus having a first transparent display panel and a second transparent display panel coincided with each other, and the method includes following steps. In step S510, an image signal having a plurality of display data, a transparency control signal having a plurality of transparent values, a first transparent parameter and a second transparent parameter are received by an image processor, wherein the first transparent parameter is used for representing a first gray value corresponding to the transparent state of the first transparent display panel, and the second transparent parameter is used for representing a second gray value corresponding to the transparent state of the second transparent display panel.

In step S520, the image processor performs calculation according to the image signal, the transparency control signal and the first transparent parameter to provide a first display signal having a plurality of first gray data, so as to drive the first transparent display panel, wherein the first transparent display panel has a first gradation within a section from a transparent state to a white state. In step S530, the image processor performs calculation according to the image signal, the transparency control signal and the second transparent parameter to provide a second display signal having a plurality of second gray data, so as to drive the second transparent display panel, wherein the second transparent display panel has a second gradation within a section from a black state to the transparent state.

In step S540, a display image having all gradations between the black state, the white state and the transparent state is displayed through the coincided first transparent display panel and the second transparent display panel. The sequence of the steps S510, S520, S530 and S540 is only an example, and the invention is not limited thereto. Moreover, details of the steps S510, S520, S530 and S540 may refer to related description of the embodiments of FIG. 1 to FIG. 4, which are not repeated.

In summary, in the transparent display apparatus and the method for driving the transparent display panel of the invention, the first display signal and the second display signal are correspondingly provided according to transmittance characteristics of the first transparent display panel and the second transparent display panel having different gradations, so as to correspondingly drive the first transparent display panel and the second transparent display panel. In this way, the image of the black state, the white state and the transparent state is displayed through the coincided first transparent display panel and the second transparent display panel, so as to improve the display effect and user experience of the transparent display apparatus.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A transparent display apparatus, comprising:
    a first transparent display panel, having a first gradation within a section from a transparent state to a white state;
    a second transparent display panel, having a second gradation within a section from a black state to the transparent state, and coincided with the first transparent display panel;
    an image processor, receiving an image signal having a plurality of display data, a transparency control signal having a plurality of transparent values, a first transparent parameter and a second transparent parameter, performing calculation according to the image signal, the transparency control signal and the first transparent parameter to provide a first display signal having a plurality of first gray data, and performing calculation according to the image signal, the transparency control signal and the second transparent parameter to provide a second display signal having a plurality of second gray data, wherein the first transparent parameter is used for representing a first gray value corresponding to the transparent state of the first transparent display panel, and the second transparent parameter is used for representing a second gray value corresponding to the transparent state of the second transparent display panel; and
    a display driver, coupled to the first transparent display panel, the second transparent display panel and the image processor, driving the first transparent display panel according to the first gray data, and driving the second transparent display panel according to the second gray data, so as to display a display image having all gradations between the black state, the white state and the transparent state through the coincided first transparent display panel and the second transparent display panel.

2. The transparent display apparatus as claimed in claim 1, wherein the first gray value and the second gray value are respectively the minimum gray value and the maximum gray value in a gray level range of the image signal.

3. The transparent display apparatus as claimed in claim 1, wherein a gray value of each of the first gray data is determined according to a following equation:

$$GL1=\alpha_1(VT)\times g1+\beta_1(VT)\times RGB,$$

wherein GL1 is the gray value of each of the first gray data, VT is the corresponding transparent value, g1 is the first transparent parameter, RGB is a gray value of the corresponding display data, $\alpha_1(VT)$ is a function for calculating transparency and is proportional to the corresponding transparent value, and $\beta_1(VT)$ is a function for calculating a degree of opacity and is inversely proportional to the corresponding transparent value.

4. The transparent display apparatus as claimed in claim 3, wherein $\alpha_1(VT)=VT/G_{MAX}$, $\beta_1(VT)=(1-VT/G_{MAX})$, $G_{MAX}$ is the maximum gray value in the gray level range of the image signal.

5. The transparent display apparatus as claimed in claim 1, wherein a gray value of each of the second gray data is determined according to a following equation:

$$GL2=\alpha_2(VT)\times g2+\beta_2(VT)\times RGB,$$

wherein GL2 is the gray value of each of the second gray data, VT is the corresponding transparent value, g2 is the second transparent parameter, RGB is a gray value of the corresponding display data, $\alpha_2(VT)$ is a function for calculating transparency and is proportional to the corresponding transparent value, and $\beta_2(VT)$ is a function for calculating a degree of opacity and is inversely proportional to the corresponding transparent value.

6. The transparent display apparatus as claimed in claim 5, wherein $\alpha_2(VT)=VT/G_{MAX}$, $\beta_2(VT)=(1-VT/G_{MAX})$, $G_{MAX}$ is the maximum gray value in the gray level range of the image signal.

7. The transparent display apparatus as claimed in claim 1, further comprising:
    a parameter acquiring circuit, coupled to the image processor, and receiving a first transmittance characteristic of the first transparent display panel and a second transmittance characteristic of the second transparent display panel, so as to provide the first transparent parameter and the second transparent parameter.

8. A method for driving a transparent display panel, adapted to a transparent display apparatus having a first transparent display panel and a second transparent display panel coincided with each other, the method for driving the transparent display panel comprising:
    receiving an image signal having a plurality of display data, a transparency control signal having a plurality of transparent values, a first transparent parameter and a second transparent parameter by an image processor, wherein the first transparent parameter is used for representing a first gray value corresponding to a transparent state of the first transparent display panel, and the second transparent parameter is used for representing a second gray value corresponding to the transparent state of the second transparent display panel;
    performing calculation by the image processor according to the image signal, the transparency control signal and the first transparent parameter to provide a first display signal having a plurality of first gray data, so as to drive the first transparent display panel, wherein the first transparent display panel has a first gradation within a section from a transparent state to a white state;
    performing calculation by the image processor according to the image signal, the transparency control signal and the second transparent parameter to provide a second display signal having a plurality of second gray data, so as to drive the second transparent display panel, wherein the second transparent display panel has a second gradation within a section from a black state to the transparent state; and
    displaying a display image having all gradations between the black state, the white state and the transparent state through the coincided first transparent display panel and the second transparent display panel.

9. The method for driving the transparent display panel as claimed in claim 8, wherein the first gray value and the second gray value are respectively the minimum gray value and the maximum gray value in a gray level range of the image signal.

10. The method for driving the transparent display panel as claimed in claim 8, wherein a gray value of each of the first gray data is determined according to a following equation:

$$GL1 = \alpha_1(VT) \times g1 + \beta_1(VT) \times RGB,$$

wherein GL1 is the gray value of each of the first gray data, VT is the corresponding transparent value, g1 is the first transparent parameter, RGB is a gray value of the corresponding display data, $\alpha_1(VT)$ is a function for calculating transparency and is proportional to the corresponding transparent value, and $\beta_1(VT)$ is a function for calculating a degree of opacity and is inversely proportional to the corresponding transparent value.

11. The method for driving the transparent display panel as claimed in claim 8, wherein a gray value of each of the second gray data is determined according to a following equation:

$$GL2 = \alpha_2(VT) \times g2 + \beta_2(VT) \times RGB,$$

wherein GL2 is the gray value of each of the second gray data, VT is the corresponding transparent value, g2 is the second transparent parameter, RGB is a gray value of the corresponding display data, $\alpha_2(VT)$ is a function for calculating transparency and is proportional to the corresponding transparent value, and $\beta_2(VT)$ is a function for calculating a degree of opacity and is inversely proportional to the corresponding transparent value.

* * * * *